United States Patent
Nonomura

(10) Patent No.: US 12,092,769 B2
(45) Date of Patent: Sep. 17, 2024

(54) PHOTODETECTORS AND METHODS AND RANGING DEVICES AND METHODS

(71) Applicant: NIKON VISION CO., LTD., Tokyo (JP)

(72) Inventor: Takehito Nonomura, Nishitama-gun (JP)

(73) Assignee: NIKON VISION CO., LTD., Tokyo (JP)

( * ) Notice: Subject to any disclaimer, the term of this patent is extended or adjusted under 35 U.S.C. 154(b) by 792 days.

(21) Appl. No.: 17/103,009

(22) Filed: Nov. 24, 2020

(65) Prior Publication Data

US 2021/0080553 A1     Mar. 18, 2021

Related U.S. Application Data

(63) Continuation of application No. PCT/JP2018/020821, filed on May 30, 2018.

(51) Int. Cl.
*G01S 7/4863*     (2020.01)
*G01S 7/48*     (2006.01)
(Continued)

(52) U.S. Cl.
CPC .......... *G01S 7/4863* (2013.01); *G01S 7/4808* (2013.01); *G01S 7/4865* (2013.01); *G01S 7/4873* (2013.01); *G01S 17/08* (2013.01); *G01S 17/10* (2013.01)

(58) Field of Classification Search
CPC .... G01S 7/4863; G01S 7/4808; G01S 7/4865; G01S 7/4873; G01S 17/08; G01S 17/10
See application file for complete search history.

(56) References Cited

U.S. PATENT DOCUMENTS 3,705,383 A * 12/1972 Frayer .................... G06V 20/69
                                             377/10
4,495,585 A * 1/1985 Buckley ................. G01R 23/16
                                            702/180

(Continued)

FOREIGN PATENT DOCUMENTS

CN         104296866 A     1/2015
JP         106-003406 A     1/1994
(Continued)

OTHER PUBLICATIONS

Cossio et al. "Predicting Small Target Detection Performance of Low-SNR Airborne Lidar", IEEE J of. Sel. topics in App Earth Obs and Rem Sensing (vol. 3, N. 4, pp. 672-688) (Year: 2010).*
(Continued)

*Primary Examiner* — Mohamed K Amara
(74) *Attorney, Agent, or Firm* — Oliff PLC

(57) ABSTRACT

With a ranging device and a ranging method according to the present embodiment, occurrence of a first event in which the intensity of a detection signal corresponding to reflected light output from a detection unit exceeds a first threshold and occurrence of a second event in which the intensity falls below a second threshold smaller or larger than the first threshold are counted for each predetermined elapsed time after the measuring beam emission from a projector. Based on integration results (i.e., histograms) obtained by integrating the counts for a plurality of times of light emission, a target signal derived from the reflected light can be extracted from the detection signal including random noise derived from external light, a detection time from the light emission to the detection by the detection unit can be determined, and a distance to an object can be precisely determined.

18 Claims, 15 Drawing Sheets

(51) Int. Cl.
*G01S 7/4865* (2020.01)
*G01S 7/487* (2006.01)
*G01S 17/08* (2006.01)
*G01S 17/10* (2020.01)

(56) References Cited

U.S. PATENT DOCUMENTS

| | | | | |
|---|---|---|---|---|
| 5,390,188 | A * | 2/1995 | Dawson | H04L 43/045 |
| | | | | 714/717 |
| 10,477,355 | B1 * | 11/2019 | Niranjayan | A61B 5/1113 |
| 10,539,662 | B2 * | 1/2020 | Takizawa | G02B 7/32 |
| 10,794,695 | B2 * | 10/2020 | Kitamura | G01S 17/10 |
| 10,962,628 | B1 * | 3/2021 | Laifenfeld | G01S 7/487 |
| 11,222,305 | B1 * | 1/2022 | Clayton | G06Q 10/087 |
| 2012/0194798 | A1 * | 8/2012 | Crawford | G01S 17/14 |
| | | | | 356/4.02 |
| 2015/0204978 | A1 | 7/2015 | Hammes et al. | |
| 2015/0323654 | A1 * | 11/2015 | Jachmann | G01S 7/4865 |
| | | | | 356/5.01 |
| 2017/0003121 | A1 * | 1/2017 | Brandli | G01B 11/25 |
| 2018/0253404 | A1 * | 9/2018 | Moore | G06F 11/0703 |
| 2018/0259645 | A1 * | 9/2018 | Shu | G01S 17/89 |
| 2019/0056497 | A1 * | 2/2019 | Pacala | G01S 7/4816 |
| 2019/0326347 | A1 * | 10/2019 | Bulteel | G01S 7/487 |
| 2020/0182985 | A1 * | 6/2020 | Wu | G01S 17/14 |
| 2020/0300984 | A1 * | 9/2020 | Matsuura | G01S 7/4817 |
| 2021/0333394 | A1 * | 10/2021 | Pacala | G01S 7/4863 |
| 2022/0043128 | A1 * | 2/2022 | Pacala | G01S 17/89 |
| 2022/0137193 | A1 * | 5/2022 | Ohki | G01C 3/06 |
| | | | | 356/5.01 |
| 2022/0294969 | A1 * | 9/2022 | Bousquet | G06V 10/82 |
| 2022/0342074 | A1 * | 10/2022 | Han | G01S 17/894 |
| 2023/0108583 | A1 * | 4/2023 | Azuma | G01S 7/4863 |
| | | | | 356/5.01 |
| 2024/0028667 | A1 * | 1/2024 | Moore | G06F 17/18 |

FOREIGN PATENT DOCUMENTS

| | | |
|---|---|---|
| JP | 2011-166659 A | 8/2011 |
| JP | 2012-026853 A | 2/2012 |
| JP | 2014-163884 A | 9/2014 |

OTHER PUBLICATIONS

Jul. 24, 2018 International Search Report issued in International Patent Application No. PCT/JP2018/020821.

Dec. 1, 2020 International Report on Patentability issued in International Patent Application No. PCT/JP2018/020821.

* cited by examiner

| INPUT | | OUTPUT | | REMARKS |
|---|---|---|---|---|
| posi | nega | inc | dec | |
| 0 | 0 | 0 | 0 | ZERO COUNT WITH NO INPUT |
| 1 | 0 | 1 | 0 | POSITIVELY COUNT AS ONLY FIRST EVENT HAS OCCURRED |
| 0 | 1 | 0 | 1 | NEGATIVELY COUNT AS ONLY SECOND EVENT HAS OCCURRED |
| 1 | 1 | 0 | 0 | ZERO COUNT AS CANCELED EACH OTHER |

FIG. 9

PHOTODETECTORS AND METHODS AND RANGING DEVICES AND METHODS

The contents of the following Japanese patent application are incorporated herein by reference:
NO. PCT/JP2018/020821 filed in WO on May 30, 2018.

BACKGROUND

1. Technical Field

The present invention relates to a photodetector and a method, and to a ranging device and a method.

2. Related Art

Some ranging devices measure a distance to an object based on a propagation time of a measuring beam reflected from the object (see, for example, Patent Document 1). To improve the ranging performance, a target signal derived from the reflected light from the object needs to be accurately extracted from a detection signal including noise derived from external light such as sunlight.

[Patent Document 1] Japanese Unexamined Patent Application Publication No. 2012-26853

General Disclosure

A first aspect of the present invention provides a photodetector comprising: a projector configured to emit light to an object for a plurality of times; a detection unit configured to detect reflected light from the object; and a processing unit configured to, for each light emission from the projector, count an occurrence of a first event in which intensity of a detection signal output from the detection unit exceeds a first threshold and an occurrence of a second event in which the intensity falls below a second threshold smaller or larger than the first threshold for each predetermined elapsed time from the light emission, integrate the counts for the plurality of times of light emission for each elapsed time, and determine a detection time from the light emission to the detection of the reflected light by the detection unit based on that integration result.

A second aspect of the present invention provides a ranging device configured to determine a distance to the object based on the detection time determined by the photodetector according to the first aspect.

A third aspect of the present invention provides a photodetector comprising: a projector configured to emit light to an object for a plurality of times; a detection unit configured to detect reflected light from the object; a converting unit configured to convert a detection signal output from the detection unit into differential signals including a first signal and a second signal with the polarity of the first signal inverted; and a processing unit configured to generate a third signal with the first signal provided with a first offset and a fourth signal with the first signal provided with a second offset larger or smaller than the first offset, in each of the plurality of times of light emission from the projector, for each predetermined elapsed time from the light emission, compare the intensity of the second signal and the intensity of the third signal to count an occurrence of a first event in which the intensity of the second signal exceeds the intensity of the third signal, and compare the intensity of the second signal and intensity of the fourth signal to count an occurrence of a second event in which the intensity of the second signal falls below the intensity of the fourth signal, and integrate the counts for the plurality of times of light emission for each elapsed time, and determine a detection time from the light emission to the detection of the reflected light by the detection unit based on that integration result.

A fourth aspect of the present invention provides a photodetection method comprising: emitting light to an object for a plurality of times; detecting reflected light from the object; for each light emission, counting an occurrence of a first event in which the intensity of a detection signal of the reflected light exceeds a first threshold and an occurrence of a second event in which the intensity falls below a second threshold smaller or larger than the first threshold for each predetermined elapsed time from the light emission, and integrating the counts for the plurality of times of light emission for each elapsed time; and determining a detection time from the light emission to the detection of the reflected light based on an integration result of the counts of the occurrence of the first event and the second event.

A fifth aspect of the present invention provides a ranging method comprising determining a distance to the object based on the detection time determined by the photodetection method according to the fourth aspect.

A sixth aspect of the present invention provides a photodetection method comprising: emitting light to an object for a plurality of times; detecting reflected light from the object; converting a detection signal of the reflected light into differential signals including a first signal and a second signal with the polarity of the first signal inverted; generating a third signal with the first signal provided with a first offset and a fourth signal with the first signal provided with a second offset larger or smaller than the first offset, in each of the plurality of times of light emission from the projector, for each predetermined elapsed time from the light emission, comparing the intensity of the second signal and the intensity of the third signal to count an occurrence of a first event in which the intensity of the second signal exceeds the intensity of the third signal, and comparing the intensity of the second signal and intensity of the fourth signal to count an occurrence of a second event in which the intensity of the second signal falls below the intensity of the fourth signal, and integrating the counts for the plurality of times of light emission for each elapsed time, and determine a detection time from the light emission to the detection of the reflected light by the detection unit based on that integration result.

Not all the features of the present invention are provided in the overview of the present invention described above. The present invention may also be a sub-combination of the features described above.

BRIEF DESCRIPTION OF THE DRAWINGS

FIG. 9 illustrates logical operation procedure by a logic circuit.

DESCRIPTION OF EXEMPLARY EMBODIMENTS

Hereinafter, the present invention will be described through (some) embodiment(s) of the present invention. The embodiment(s) do(es) not limit the invention according to the claims. All the combinations of the features described in the embodiment(s) are not necessarily essential to means provided by aspects of the invention.

Figure 1:
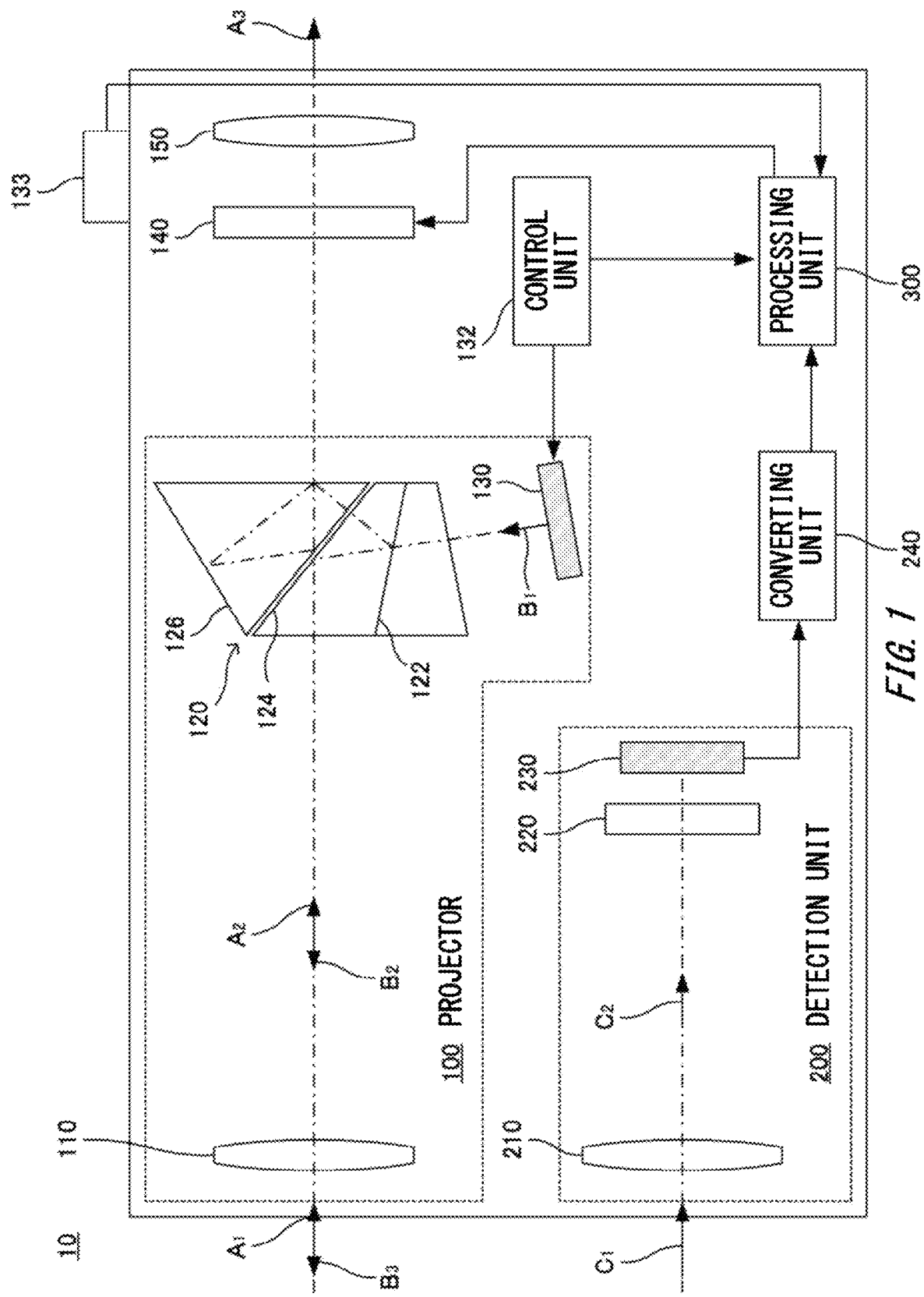
FIG. 1 illustrates a configuration of a ranging device according to the present embodiment.

FIG. 1 illustrates a configuration of a ranging device 10 according to the present embodiment. Note that the ranging device 10 includes a photodetector. Herein, a direction in which a projector 100 emits a measuring beam, that is, an arrow direction of a light beam $B_3$ is defined as a forward side, and a direction opposite thereto, that is, an arrow direction of a light beam $A_3$ is defined as a backward side. The ranging device 10 improves the ranging performance by accurately extracting a target signal derived from reflected light from an object, from a detection signal including noise derived from external light, and includes the projector 100, a reticle plate 140, an eyepiece 150, a control unit 132, a detection unit 200, a converting unit 240, and a processing unit 300.

The projector 100 is a unit that emits the measuring beam to the object for a plurality of times. The projector 100 includes a light emitting unit 130, an erect prism 120, and an objective lens 110.

The light emitting unit 130 uses a light source to emit a pulsed measuring beam (that is, a light beam $B_1$) to the erect prism 120 at a predetermined interval. An example of the light source that can be used include a semiconductor laser that oscillates infrared light. The light emitting unit 130 emits the pulsed measuring beam for a predetermined number of times (for example, 320 times) at a predetermined interval (for example, at an interval of 500 to 700 μ seconds) in a single ranging operation.

The erect prism 120 is an optical element that sends the measuring beam emitted from the light emitting unit 130 toward the forward side, and sends an incident light beam to the eyepiece 150 on the backward side. An example of the erect prism 120 that can be used includes a Dach prism, a Porro prism, and the like. The erect prism 120 includes a dichroic reflection surface 122 that reflects light in a visible light band and transmits light in an infrared band, and total reflection surfaces 124 and 126 having high reflectance for both the visible light band and the infrared band. In the erect prism 120, the measuring beam (light beam $B_1$) is transmitted through the dichroic reflection surface 122 and is reflected by the total reflection surface 124 to be propagated toward the forward side in the ranging device 10 as a light beam $B_2$. In the erect prism 120, an incident light beam (light beam $A_1$) is reflected by the dichroic reflection surface 122, the total reflection surfaces 124 and 126, and other reflection surfaces. Thus, an inverted mirror image formed by the incident light beam is inverted to be an erect image.

The objective lens 110 is an optical element that collimates the light beam $B_2$ output from the erect prism 120, and sends the resultant light beam toward the forward side of the ranging device 10 as the light beam $B_3$.

The reticle plate 140 is arranged at the focal position of the objective lens 110. The reticle plate 140 includes a collimation indicator and a display unit (none of which is illustrated). For example, the collimation indicator has a shape such as a crosshair, a rectangular frame, or a circular frame. The collimation indicator may be formed by printing, engraving, or the like on a plate that is transparent to visible light, or may be displayed using transmissive liquid crystals. The display unit shows to the user with a text, an image, or the like, a result of measuring the distance to the object, using transmissive liquid crystals and the like. Instead of directly being provided to the reticle plate 140, the display unit may be formed by reflective liquid crystals and an optical system guiding a display image, using the liquid crystals, to the reticle plate 140. The display unit may display, in addition to the ranging result, a remaining battery level, an alert, clock, and the like.

The eyepiece 150 is an optical element that collects the incident light beam and sends the resultant light toward the backward side as the light beam $A_3$. In the ranging device 10, the front end of the eyepiece 150 faces the back end of the erect prism 120.

The erect prism 120, the objective lens 110, the reticle plate 140, and the eyepiece 150 form a collimation unit that the user uses for collimating the ranging device 10 to the object. The collimation unit shares a part of the optical system with the projector 100, so that apparent optical axes of the projector 100 and the collimation unit match in the ranging device 10.

Among lights reflected or scattered from an object positioned on the forward side of the ranging device 10, the light beam $A_1$, which propagates within a range of a visual angle of the objective lens 110, is incident on the collimation unit. The light beam $A_1$ is collected via the objective lens 110 as a light beam $A_2$, and then emitted, as the light beam $A_3$, through the erect prism 120, the reticle plate 140, and the eyepiece 150 toward the backward side of the ranging device 10. This enables the user to observe the erect image of the object through the eyepiece 150.

The collimation indicator provided on the reticle plate 140 is superimposed on the image of the object observed by the user through the eyepiece 150. With the collimation indicator superimposed on the image observed through the eyepiece 150, the user collimates the ranging device 10 to the object. In this case, the apparent optical axes of the projector 100 and the collimation unit match as described above, and thus the position indicated by the collimation indicator is irradiated with the measuring beam.

The control unit 132 is a unit that controls the intensity, the number of emissions, the interval, and the like of the measuring beam emitted from the projector 100 (light emitting unit 130). The control unit 132 may also transmit the emission timing of the measuring beam to the processing unit 300. Thus, the processing unit 300 can process a detection signal, corresponding to the reflected light, output from the detection unit 200, for each measuring beam emission from the projector 100. The control unit 132 includes an operation button 133 provided to a casing of the ranging device 10, and starts a ranging operation described later when the user presses this button.

The detection unit 200 is a unit that detects the reflected light from the object and outputs the detection signal in a form of an electrical signal. The detection unit 200 includes a receiver lens 210, a bandpass filter 220, and a light receiving element 230.

The receiver lens 210 is an optical element that collects the reflected light from the object (i.e., a light beam $C_1$) and sends the resultant light beam to the light receiving element 230 as a light beam $C_2$. The receiver lens 210 has an optical axis not matching that of the objective lens 110 of the projector 100.

The bandpass filter 220 is an optical element that transmits light in a narrow band including the reflected light, and blocks or attenuates light in other bands. The bandpass filter 220 is disposed on the backward side of the receiver lens 210.

The light receiving element 230 is an element that receives the reflected light, and outputs an electrical signal (also referred to as a light receiving signal) corresponding to the intensity of the light. For example, as the light receiving element 230, a photodiode, a phototransistor, or the like sensitive to the band of the measuring beam may be used. The light receiving element 230 is disposed on the backward side of the bandpass filter 220. Preferably, the light receiving area of the light receiving element 230 is smaller, for the sake of eliminating the influence of background light on the measuring beam.

In the detection unit 200 with the configuration described above, the light beam $C_1$ reflected or scattered from an object positioned on the forward side of the ranging device 10 is incident on the receiver lens 210. The light beam $C_1$ is collected by the receiver lens 210, transmitted through the bandpass filter 220 as the light beam $C_2$, and then received by the light receiving element 230. The light receiving element 230 outputs a light receiving signal corresponding to the intensity of the received light toward the converting unit 240.

Figure 2:
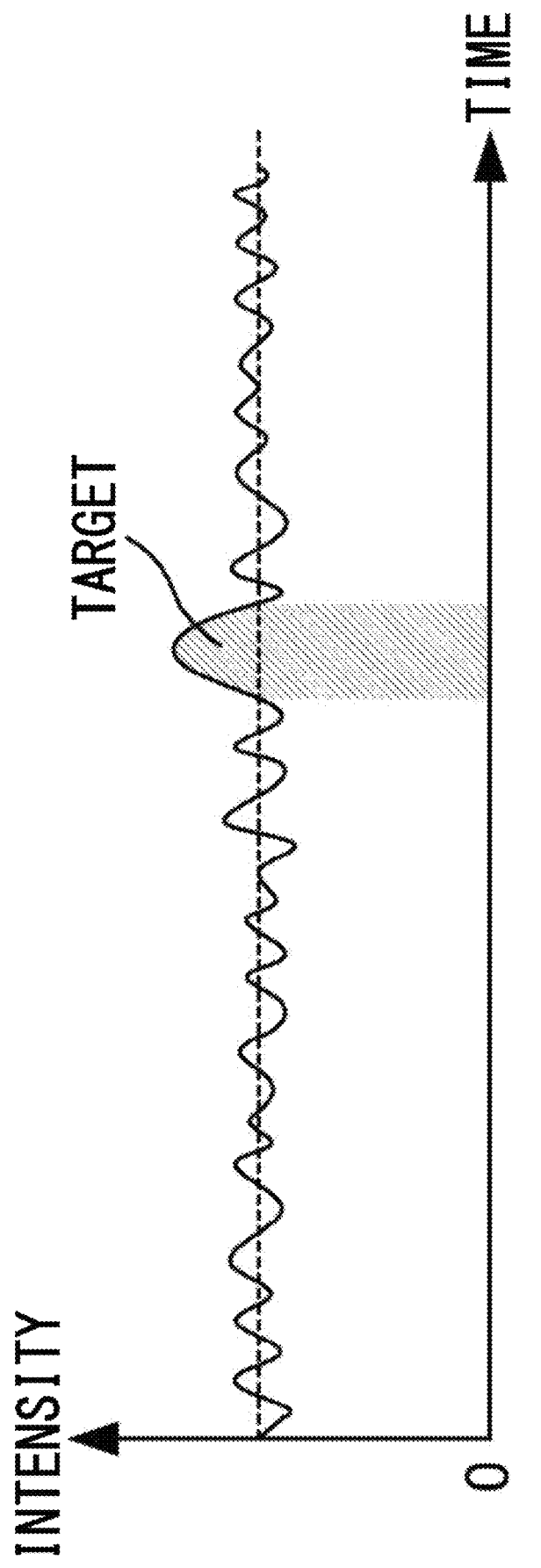
FIG. 2 illustrates an example of a detection signal output from a detection unit for long distance ranging.

FIG. 2 illustrates an example of a detection signal output from the detection unit 200 in response to a single measuring beam emission during the long distance ranging. A dotted line represents an offset level (i.e., an average level of the signal). When the object is positioned at a long distance, and a periphery of the object is bright, not only the reflected light from the object but also external light such as sunlight is detected. Furthermore, electrical noise applied to a circuit board and the like is included. Thus, a target signal (i.e., a hatched portion in FIG. 2) derived from the reflected light is buried in largely fluctuating noise with a high offset level.

For example, the converting unit 240 includes an amplifier, and uses this to amplify the light receiving signal output from the light receiving element 230. The converting unit 240 may further convert the light receiving signal into differential signals. Thus, transmission noise can be reduced. The converting unit 240 supplies the processing unit 300 with the amplified light receiving signal as a detection signal.

The processing unit 300 is a unit that determines a detection time of the reflected light based on the detection signal output from the converting unit 240, that is, a time period T from each measuring beam emission by the projector 100 to detection of the reflected light of the measuring beam reflected by the object by the detection unit 200 (light receiving element 230), and further determines the distance to the object based on the time period T.

Figure 3:
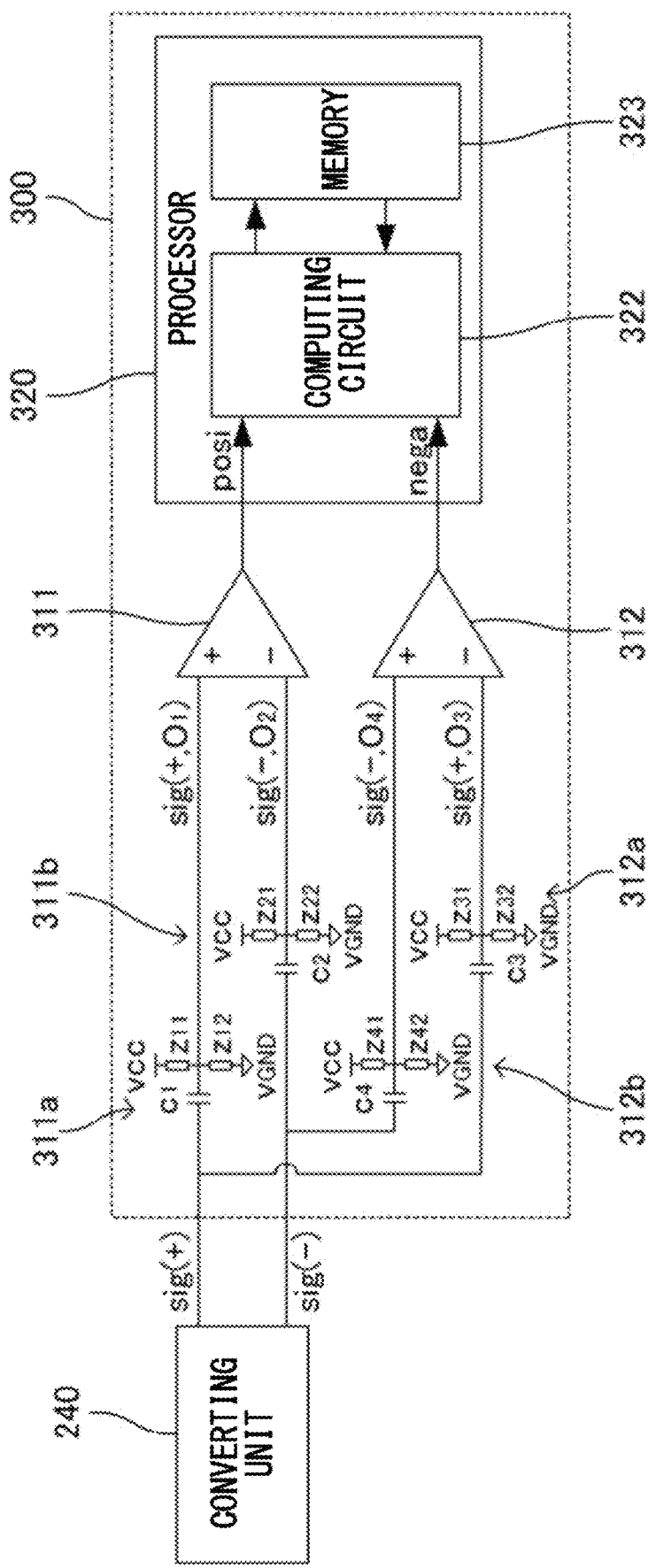
FIG. 3 illustrates an example of a configuration of a processing unit.

FIG. 3 illustrates a configuration of the processing unit 300. In this example, the converting unit 240 multiplies a detection signal sig, output from the detection unit 200, by ½ to generate a first signal sig(+) and multiplies the detection signal sig by −½ to generate a second signal sig(−), to convert the detection signal sig into differential signals (sig(+), sig(−)) including a set of the first signal and the second signals, and inputs the differential signals to the processing unit 300 through a pair of transmission lines. Any differential signal can be generated as long as a condition that a difference as a result of subtracting the second signal from the first signal is equal to the detection signal (sig=sig(+)-sig(−)) is satisfied. The processing unit 300 includes level converting units 311a, 311b, 312a, and 312b, comparators 311 and 312, and a processor 320. Each of the comparators 311 and 312 is connected to the converting unit 240 through the pair of transmission lines.

The level converting units 311a and 311b are units that are provided on the pair of transmission lines and convert offset levels of the set of first signal sig(+) and second signal sig(−), transmitted through the transmission lines, into first and second offset levels $O_1$ and $O_2$. The level converting unit 311a (311b) includes a capacitive element $c_1$ ($c_2$) and two voltage-dividing elements $z_{11}$, $z_{12}$ ($z_{21}$, $z_{22}$). For example, as the capacitive element $c_1$ ($c_2$), a capacitor may be used. The capacitive element $c_1$ ($c_2$) is provided on a transmission line, and removes (lowers the level to zero) a constant voltage component (i.e., offset level) included in the first signal (second signal) transmitted through the transmission line. For example, as the voltage-dividing elements $z_{11}$, $z_{12}$ ($z_{21}$, $z_{22}$), resistors may be used. One voltage-dividing element $z_{11}$ ($z_{21}$) is connected between the transmission line and a reference potential (assumed to be a high potential $V_{CC}$) and the other voltage-dividing element $z_{12}$ ($z_{22}$) is connected between the transmission line and another reference potential (assumed to be a low potential $V_{GND}$). Thus, the potential difference $V_{CC}$-$V_{GND}$ is divided by a voltage-dividing ratio $z_{12}/(z_{11}+z_{12})(z_{22}/(z_{21}+z_{22}))$ into the first offset level $O_1$ (second offset level $O_2$) to be added to the first signal (second signal). As a result, a signal sig(+,$O_1$) (sig(−,$O_2$)) with the offset level converted is generated and input to the comparator 311. A difference ($O_2$−$O_1$) of the second offset level $O_2$ from the first offset level $O_1$ provides a first threshold (note that the offset level of the detection signal sig serves as a reference) serving as a reference to be compared with the intensity of the detection signal sig.

The level converting units 312a and 312b are units that are provided on the pair of transmission lines and convert the offset levels of the set of first signal sig(+) and second signal sig(−), transmitted through the transmission lines, into third and fourth offset levels $O_3$ and $O_4$. The level converting unit 312a (312b) includes a capacitive element $c_3$ ($c_4$) and two voltage-dividing elements $z_{31}$, $z_{32}$ ($z_{41}$, $z_{42}$). The capacitive element $c_3$ ($c_4$) is provided on a transmission line, and removes an offset level included in the first signal (second signal) transmitted through the transmission line. One voltage-dividing element $z_{31}$ ($z_{41}$) is connected between the transmission line and a reference potential (assumed to be a high potential $V_{CC}$) and the other voltage-dividing element $z_{32}$ ($z_{42}$) is connected between the transmission line and another reference potential (assumed to be a low potential $V_{GND}$). Thus, the potential difference $V_{CC}$-$V_{GND}$ is divided by a voltage-dividing ratio $z_{32}/(z_{31}+z_{32})(z_{42}/(z_{41}+z_{42}))$ into the third offset level $O_3$ (fourth offset level $O_4$) to be added to the first signal (second signal). As a result, a signal sig(+,$O_3$) (sig(−,$O_4$)) with the offset level converted is generated and input to the comparator 312. A difference ($O_4-O_3$) of the fourth offset level $O_4$ from the third offset level $O_3$ provides a second threshold (note that the offset level of the detection signal sig serves as a reference) serving as a reference to be compared with the intensity of the detection signal sig.

Only one of the set of first signal sig(+) and second signal sig(−) may be provided with offset levels. For example, the offset levels $O_2$ and $O_4$ may be zeroed, and only the first signal sig(+) may be provided with the offset levels $O_1$ and $O_3$. Furthermore, the offset levels $O_1$ and $O_3$ may be zeroed, and only the second signal sig(−) may be provided with the offset levels $O_2$ and $O_4$.

The offset levels of the first and the second signals are likely to be highly dependent on the intensity of the external light, and thus may largely vary depending on the time of the day, weather, or the like. With the level converting units 311a, 311b, 312a, and 312b provided, the offset levels of the first and the second signals can be uniquely determined, without depending on the offset before the processing. Thus, the first and the second thresholds to be compared with the intensity of the detection signal, can be uniquely determined without depending on the offset levels of the first and the second signals.

The comparator 311 is an element that compares the intensity of the detection signal with the first threshold, and outputs a signal "1" (signal "0") when the intensity is larger than (smaller than or equal to) the first threshold. An output from the comparator 311 is referred to as a signal posi. The pair of transmission lines connected to the converting unit 240 are respectively connected to a non-inverting input and an inverting input of the comparator 311. Thus, the first signal sig(+,$O_1$) and the second signal sig(−,$O_2$) that are output from the converting unit 240 and have the offset levels converted are respectively input to the non-inverting input and the inverting input of the comparator 311, so that the intensity of the signal sig(+,$O_1$) is compared with the intensity of the signal sig(−,$O_2$). Thus, the intensity of the detection signal sig is compared with the first threshold.

The comparator 312 is an element that inverts the detection signal, compares the intensity of the resultant signal with the second threshold, and outputs a signal "1" (signal "0") when the intensity is smaller than (larger than or equal to) the second threshold. An output from the comparator 312 is referred to as a signal nega. The pair of transmission lines connected to the converting unit 240 are inversely connected to a non-inverting input and an inverting input of the comparator 312, respectively. Thus, the first signal sig(−,$O_4$) and the second signal sig(+,$O_3$) that are output from the converting unit 240 and have the offset levels converted are respectively input to the non-inverting input and the inverting input of the comparator 312, so that the intensity of the signal sig(+,$O_3$) is inverted and the inverted intensity is compared with the intensity of the signal sig(−,$O_4$). Thus, the intensity of the detection signal sig is inverted and the inverted intensity is compared with the second threshold.

The first threshold and the second threshold are different from each other. In the present embodiment, the second threshold is smaller than the first threshold. More preferably, the first threshold is determined to be larger than the offset level of the detection signal, and the second threshold is determined to be smaller than the offset level of the detection signal. Thus, as described later, counting occurrences of a first event in which the intensity of the detection signal exceeds the first threshold can extract, from the detection signal, a target signal having a positive amplitude relative to the offset level. Still, noise (referred to as positive-side noise) fluctuating on the positive side relative to the offset level may also be detected. In view of this, counting occurrences of a second event in which the intensity of the detection signal falls below the second threshold can detect noise (referred to as negative-side noise) that fluctuates on the negative side relative to the offset level and is randomly generated as in the case of the positive-side noise. Note that when the intensity of the detection signal is equal to or smaller than the first threshold and is equal to or larger than the second threshold, none of the events is counted. As described later, for a plurality of times of the measuring beam emission, integrating each of the occurrence counts of the first and second events to create a histogram, and calculating a difference between the counts enables the positive-side noise to be removed using the negative-side noise included in the detection signals between different detections of the measuring beam. Thus, the target signal can be accurately extracted from the detection signal including the noise.

Such processing is equivalent to a method including: positively counting when the intensity of the detection signal exceeds the first threshold; or negatively counting when the intensity falls below the second threshold; or zero counting when the intensity is equal to or smaller than the first threshold and is equal to or larger than the second threshold; and integrating these counts for a plurality of times of the measuring beam emission, to create a histogram, and thus is also referred to as a trivalent histogram method. With the trivalent histogram method, a background can be determined simultaneously with the detection of the reflected light. Thus, no sequence for determining the background needs to be implemented independently from the ranging operation.

The processor 320 processes the output signals posi and nega from the comparators 311 and 312 to create a histogram. The processor 320 includes a computing circuit 322 and a memory 323.

The computing circuit 322 counts, for each measuring beam emission from the projector 100, the occurrence of the first event in which the intensity of the detection signal output from the detection unit 200 exceeds the first threshold and the occurrence of the second event in which the intensity falls below the second threshold for each elapsed time after the measuring beam emission. Here, the computing circuit 322 uses the comparator 311 to compare the intensity of the detection signal with the first threshold, and counts the occurrences of the first event when the comparator 311 outputs the signal "1", that is, when the intensity of the detection signal exceeds the first threshold, and uses the comparator 312 to compare the intensity of the detection signal with the second threshold, and counts the occurrences of the second event when the comparator 312 outputs the signal "1", that is, when the intensity of the detection signal falls below the second threshold.

The computing circuit 322 is triggered by an emission timing of each measuring beam transmitted from the control unit 132, to sample each of the output signals posi and nega from the comparators 311 and 312 at a common sampling interval (for example, a sampling frequency 200 MHz to 300 MHz, that is, each time when $\frac{1}{200000}$ to $\frac{1}{300000}$ second elapses) for the measuring beam emission, and counts when the signal "1" is obtained (increments the counter value by one) at each interval. Thus, the occurrences of the first and the second events are both counted at each sampling timing. The resultant counts are sent to the memory 323, to be used for creating histograms.

The computing circuit 322 integrates the counts of occurrence of each of the first and the second events for a plurality of times of the measuring beam emission from the projector 100, and creates a histogram of the number of occurrences of each of the first and the second events at a time interval from the measuring beam emission (an example of an integration result).

The computing circuit 322 further determines the detection time T of the reflected light based on the histograms of the number of occurrences of the first and the second events. For each sampling timing, the computing circuit 322 subtracts a "nega histogram frequency" in the nega histogram as a result of integrating the counts of occurrence of the second event for a plurality of times of light emission from a "posi histogram frequency" in the posi histogram as a result of integrating the counts of occurrence of the first event for a plurality of times of light emission. Using the frequency obtained by this subtraction processing, a "posi-nega histogram" is created, and the detection time T of the reflected light is determined based on this histogram.

Creating the posi-nega histogram by subtracting the nega histogram frequency from the posi histogram frequency should not be construed in a limiting sense, and a nega-posi histogram may be created by subtracting the posi histogram frequency from the nega histogram frequency, and the detection time T of the reflected light may be determined based on this histogram. The subtraction between two histograms should not be construed in a limiting sense, and any operation such as multiplication may be employed as long as the target signal derived from the reflected light can be extracted from the detection signal including noise through the operation using two histograms.

The memory 323 is a storage area storing the counts of the first and the second events by the computing circuit 322. The counts of the first and the second events are recorded for each sampling timing.

The processing unit 300 (computing circuit 322) detects the sampling timing with the maximum frequency from the "posi-nega histogram", when all the measuring beam emissions by the projector 100 are completed. The sampling timing with the maximum frequency indicates the detection time T from the emission to the reception of the measuring beam.

Using the detection time T of the reflected light determined as described above, the distance to the object is calculated by Tc/2 (c is the speed of light). The ½ of the detection time T is multiplied by the speed of light because the detection time T is a time period required for light to travel over the distance from the measurement position, at which the measuring beam is emitted, to the object and back.

The processing unit 300 displays the calculated distance on the reticle plate 140. Thus, information on the distance to the object determined by the processing unit 300 is superimposed on an image of the measurement object observed by the user through the eyepiece 150.

Figure 4:
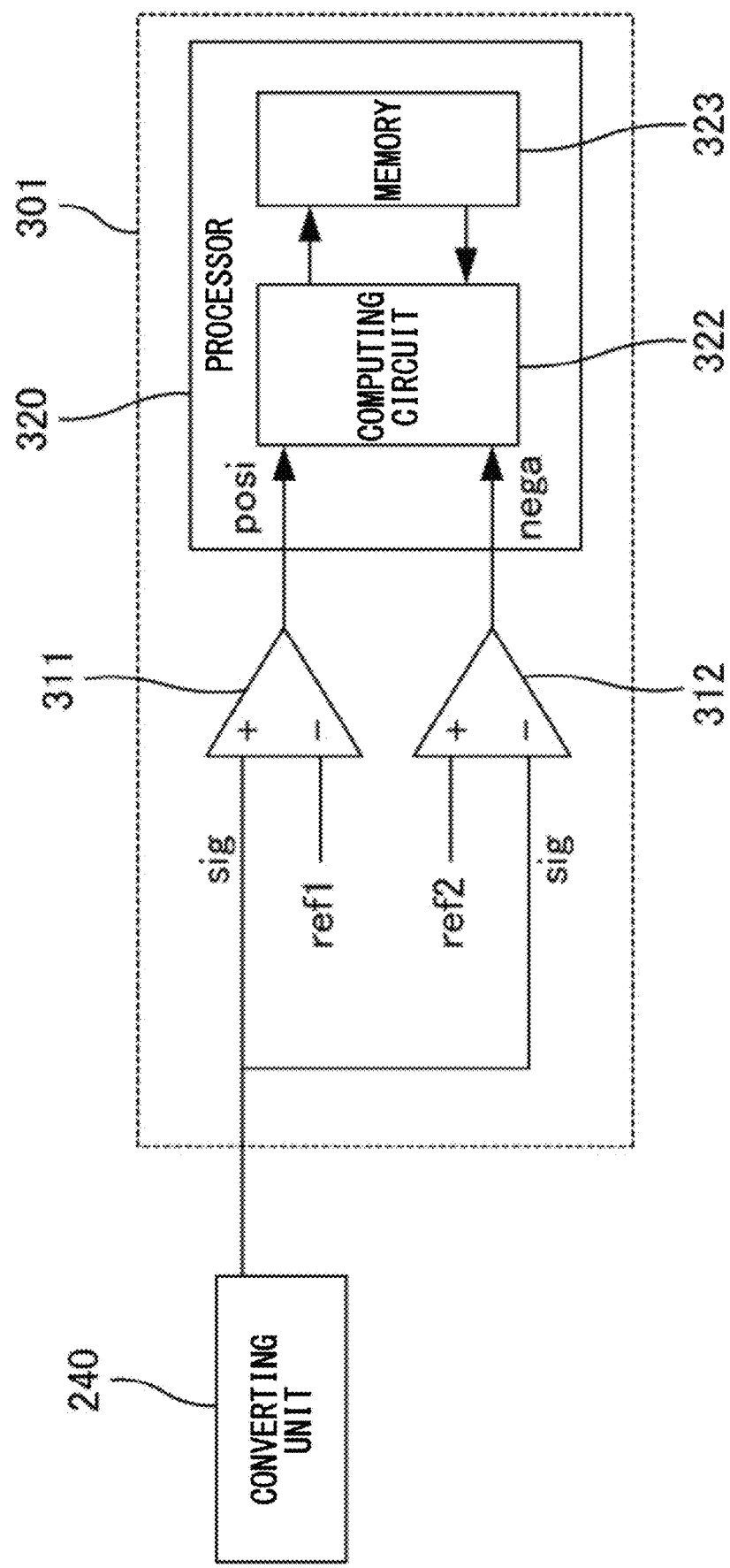
FIG. 4 illustrates another example of a configuration of the processing unit.

FIG. 4 illustrates another example of a configuration of the processing unit 301. The converting unit 240 inputs the detection signal sig, output from the detection unit 200, to the processing unit 301 through one transmission line. The processing unit 301 includes the comparators 311 and 312 and the processor 320. Each of the comparators 311 and 312 is connected to the converting unit 240 through one transmission line. The configuration and the functions of these components are the same as those in the example illustrated in FIG. 3. Thus, only differences from the example described above will be described.

The transmission line connected to the converting unit 240 and another transmission line connected to a reference potential ref1 are respectively connected to the non-inverting input and the inverting input of the comparator 311.

Here, the reference potential ref1 provides the first threshold serving as a reference to be compared with the intensity of the detection signal sig. The intensity of the detection signal sig output from the converting unit 240 is compared with the first threshold. The signal "1" (signal "0") is output when the detection signal sig is larger than (smaller than or the same as) the first threshold. Note that the first threshold (reference potential ref1) may be set to be a value suitable for distinguishing the target signal derived from the reflected light included in the detection signal sig from noise such as the noise derived from the external light or transmission noise. The first threshold may be set to be larger than the offset level of the detection signal as described above.

Yet another transmission line connected to a reference potential ref2 and the transmission line connected to the converting unit 240 are respectively connected to the non-inverting input and the inverting input of the comparator 312. Here, the reference potential ref2 provides the second threshold serving as a reference to be compared with the intensity of the detection signal sig. The second threshold differs from the first threshold, and is smaller than the first threshold in this example. The intensity of the detection signal sig output from the converting unit 240 is compared with the second threshold. The signal "1" (signal "0") is output when the detection signal sig is smaller than (larger than or the same as) the second threshold. Note that the second threshold (reference potential ref2) may be set to be a value suitable for detecting the negative-side noise included in the detection signal sig and using this for removing the positive-side noise as described above. The second threshold may be set to be smaller than the offset level of the detection signal.

The processing unit 301 uses the two comparators 311 and 312 to count the occurrences of each of the first and the second events for each measuring beam emission from the projector 100. Thus, the target signal derived from the reflected light from the object can be accurately extracted despite the noise derived from the external light, even when the detection of the reflected light by the detection unit 200 involves fluctuation.

In the present embodiment, the second threshold is smaller than the first threshold, more preferably, the first threshold is larger than the offset level of the detection signal, and the second threshold is set to be smaller than the offset level of the detection signal. However, this should not be construed in a limiting sense, and the second threshold may be larger than the first threshold, more preferably, the first threshold may be smaller than the offset level of the detection signal, and the second threshold may be larger than the offset level of the detection signal. In such a case, the computing circuit 322 counts, for each measuring beam emission from the projector 100, the occurrences of the first event in which the intensity of the detection signal output from the detection unit 200 exceeds the first threshold and of the occurrence of the second event in which the intensity falls below the second threshold larger than the first threshold, for each elapse of a time period after the measuring beam emission. Specifically, the computing circuit 322 uses the comparator 311 to compare the intensity of the detection signal with the first threshold. When the comparator 311 outputs the signal "1", that is, when the intensity of the detection signal exceeds the first threshold, the occurrence of the first event is counted. The computing circuit 322 uses the comparator 312 to compare the intensity of the detection signal with the second threshold larger than the first threshold. When the comparator 312 outputs the signal "1", that is, when the intensity of the detection signal falls below the second threshold, the occurrence of the second event is counted. When the intensity of the detection signal is positioned between the first threshold and the second threshold, the occurrences of both the first and the second events are counted. These counts offset each other in the difference between the histograms created by respectively integrating the counts of occurrences of the first and the second events. As in the embodiment described above, with the trivalent histogram method, the positive-side noise can be removed using the negative-side noise included in the detection signal, whereby the target signal can be accurately extracted from the detection signal including noise.

The first threshold and the second threshold may be determined based on a result of measuring fluctuation (such as standard deviation), as well as an average level of the detection signal output from the detection unit 200 without emitting the measuring beam from the projector 100, under a situation where external light, corresponding to the actual use condition of the ranging device 10 such as sunlight for example, may be detected, before the ranging device 10 is shipped or the like. The first threshold and the second threshold may be adjusted by the processing unit 300 to achieve a sufficiently small or preferably a minimum difference between results (that is, histograms) of integrating the counts of occurrences of the first and the second events, as a result of taking the counts of occurrences of the first and the second event for a detection signal output from the detection unit 200 without emitting the measuring beam from the projector 100, and integrating the counts of the events for a plurality of detection signals. In such a case, the first threshold and the second threshold may be optimized with the second threshold adjusted with the first threshold fixed, with the first threshold adjusted with the second threshold fixed, or with these adjustments repeated for a plurality of times.

For example, a resistor may be provided on the positive (+) side of the comparator to adjust the offset level (or the threshold) to achieve a sufficiently small difference between the histograms. A similar effect can also be obtained with a resistor provided on the negative (−) side of the comparator.

The operation of the processing unit 300 based on the trivalent histogram method will be described more in detail with reference to FIGS. 5A to 5E.

Figure 5A:
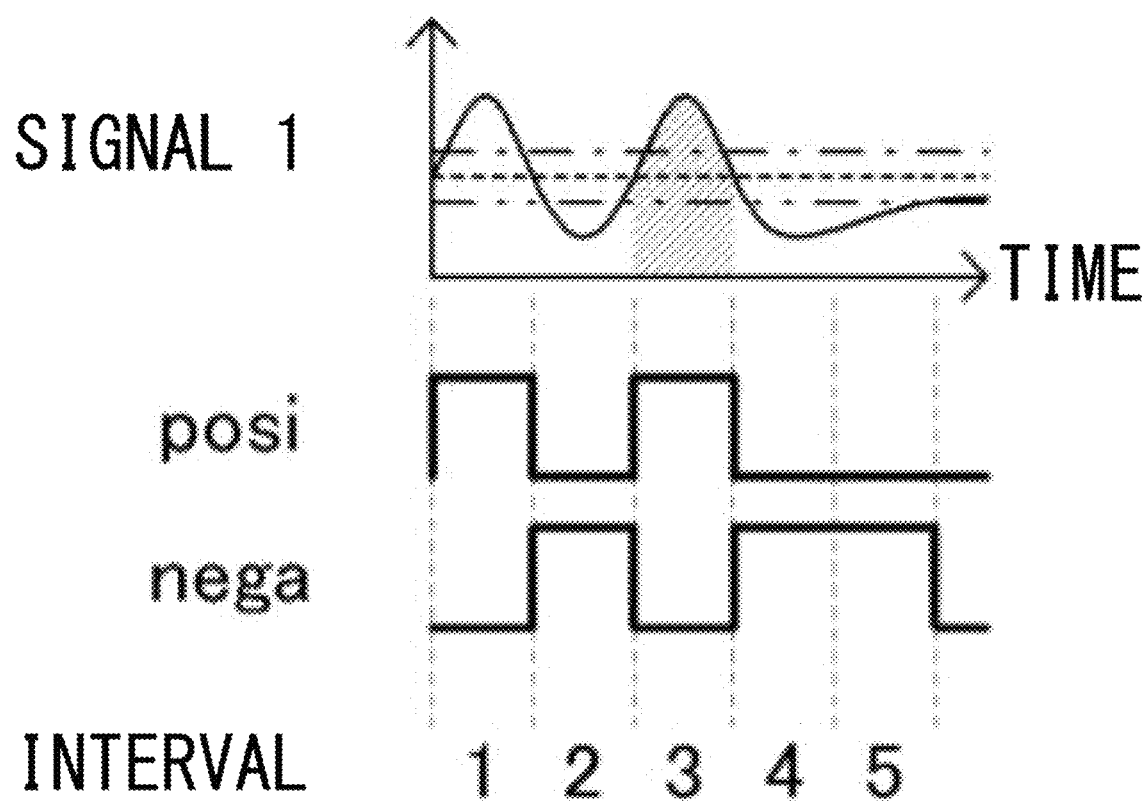
FIG. 5A illustrates an example of operations of the processing unit.
Figure 5B:
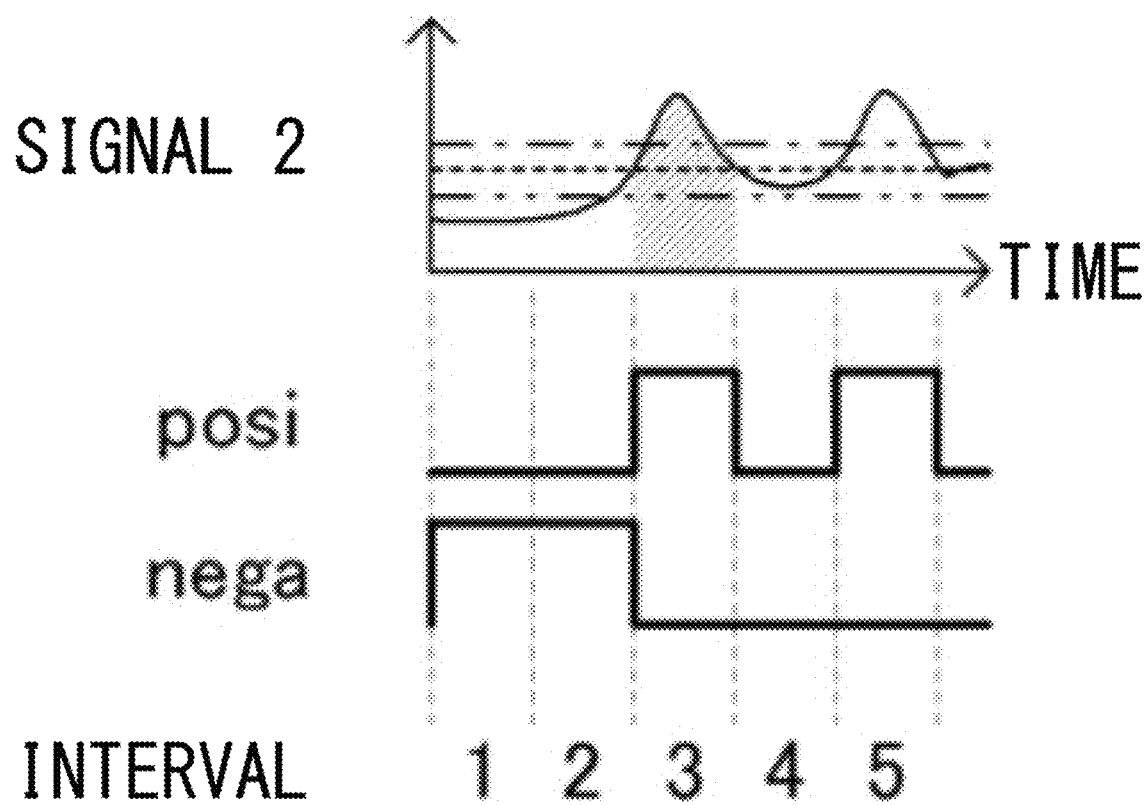
FIG. 5B illustrates an example of operations of the processing unit.
Figure 5C:
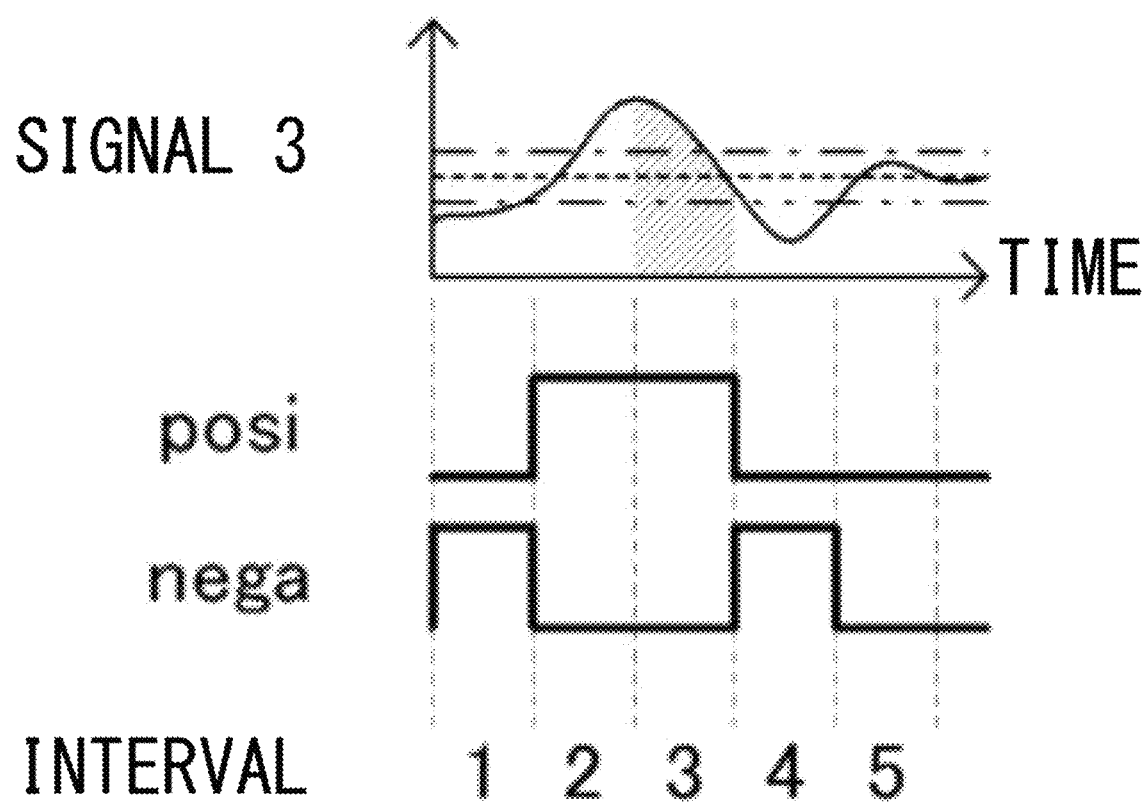
FIG. 5C illustrates an example of operations of the processing unit.

The processing unit 300 detects occurrence of each of the first and the second events, for each measuring beam emission from the projector 100. Each of the first and the second events is an event in which the intensity of the detection signal of the reflected light output from the detection unit 200 exceeds the first threshold but falls below the second threshold. FIGS. 5A to 5C illustrate a temporal change in the intensity of respective detection signals (signals 1 to 3) as well as a temporal change in the output signals posi and nega from the comparators 311 and the 312, obtained respectively for the first to the third measuring beam emissions. Note that the dotted line represents the offset level of the detection signal, the one dot chain line represents the first threshold, the two dot chain line represents the second threshold, and the hatched portion represents a part corresponding to the target signal derived from the reflected light from the object.

The intensity of the signal 1 illustrated in FIG. 5A exceeds the first threshold due to noise (positive-side noise) in the first interval of sampling, falls below the second threshold due to noise (negative-side noise) in the second interval, exceeds the first threshold due to the detection of the reflected light in the third interval, and falls below the second threshold due to noise in the fourth and the fifth intervals. The output signal posi from the comparator 311 corresponding to the signal 1 includes the signal "1" indicating the occurrence of the first event in the first and the third intervals, and includes the signal "0" indicating the first event not occurring in the second, the fourth, and the fifth intervals. The output signal nega from the comparator 312 includes the signal "1" indicating the occurrence of the second event in the second, the fourth, and the fifth intervals, and includes the signal "0" indicating the second event not occurring in the first and the third intervals.

The intensity of the signal 2 illustrated in FIG. 5B exceeds the second threshold due to noise (negative-side noise) in the first interval and the second interval of sampling, exceeds the first threshold due to the detection of the reflected light in the third interval, is between the first threshold and the second threshold in the fourth interval, and exceeds the first threshold due to noise (positive-side noise) in the fifth interval. The output signal posi from the comparator 311 corresponding to the signal 2 includes the signal "1" indicating the occurrence of the first event in the third and the fifth intervals, and includes the signal "0" indicating the first event not occurring in the first, the second, and the fourth intervals. The output signal nega from the comparator 312 includes the signal "1" indicating the occurrence of the second event in the first and the second intervals, and includes the signal "0" indicating the second event not occurring in the third to the fifth intervals.

The intensity of the signal 3 illustrated in FIG. 5C falls below the second threshold due to noise (negative-side noise) in the first interval of sampling, exceeds the first threshold due to noise (positive-side noise) in the second interval, exceeds the first threshold due to the detection of the reflected light in the third interval, and falls below the second threshold due to noise in the fourth interval, and is between the first threshold and the second threshold in the fifth interval. The output signal posi from the comparator 311 corresponding to the signal 3 includes the signal "1" indicating the occurrence of the first event in the second and the third intervals, and includes the signal "0" indicating the first event not occurring in the first, the fourth, and the fifth intervals. The output signal nega from the comparator 312 includes the signal "1" indicating the occurrence of the second event in the first and the fourth intervals, and includes the signal "0" indicating the second event not occurring in the second, the third, and the fifth intervals.

Figure 5D:
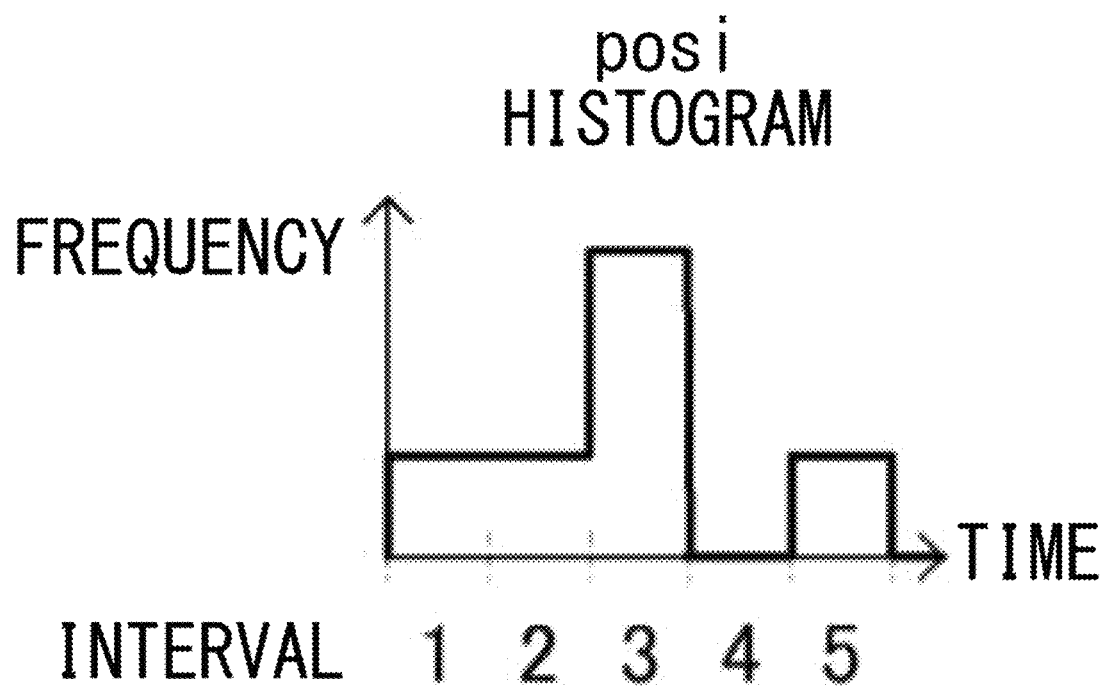
FIG. 5D illustrates an example of operations of the processing unit.
Figure 5D:
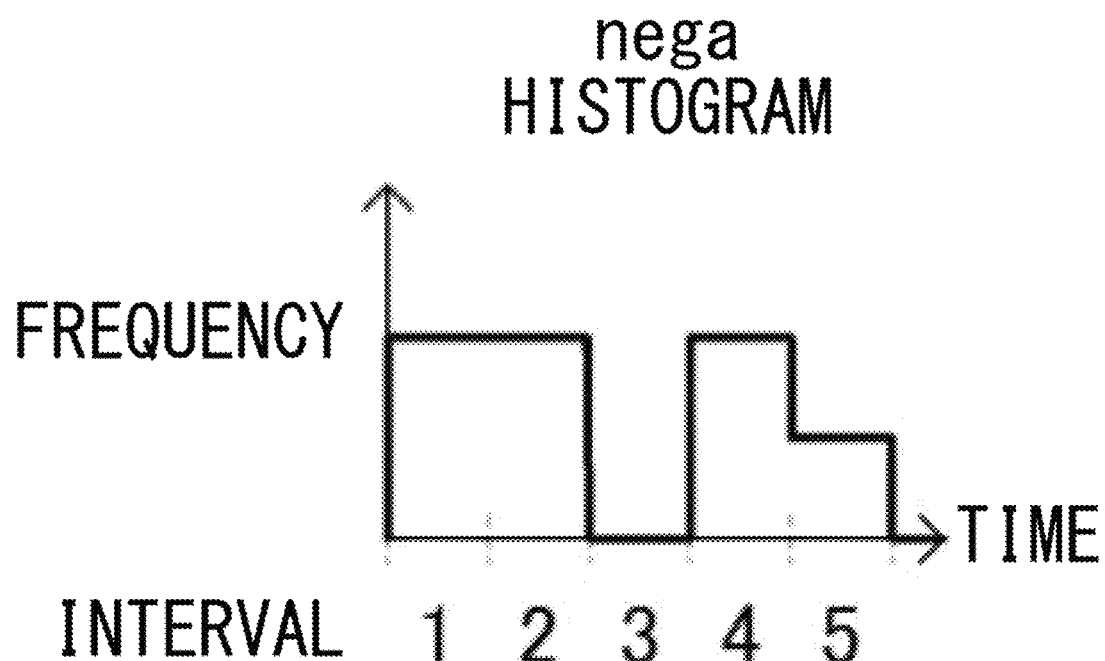

FIG. 5D illustrates results of respectively integrating the output signals posi and nega corresponding to the signals 1 to 3. Specifically, histograms of the number of occurrences of the first and the second events are on upper and lower sides, respectively. In the posi histogram of the number of occurrences of the first event, a large number of counts of the first event due to the detection of the reflected light are integrated in the third interval, and the counts due to noise (positive-side noise) are sparsely integrated in the other intervals. In the nega histogram of the number of occurrences of the second event, an extremely small number of counts of the second event (zero counting in this example) due to the detection of the reflected light are integrated in the third interval, and the counts due to noise (negative-side noise) are sparsely integrated in the other intervals.

Figure 5E:
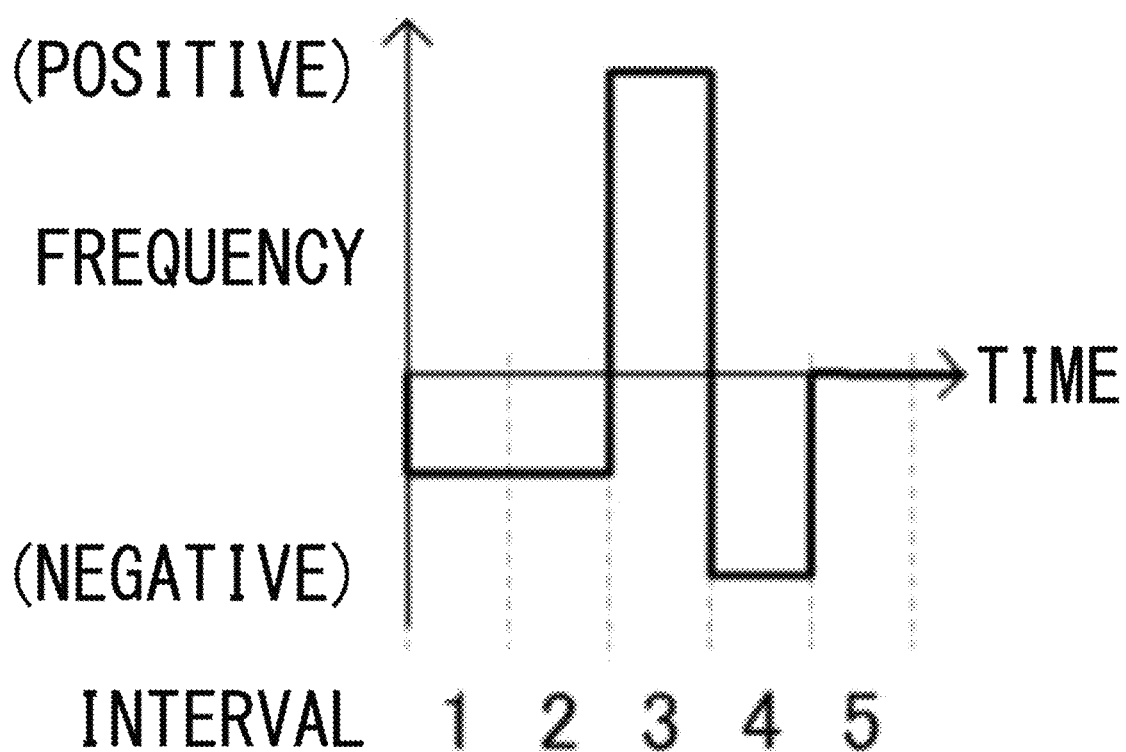
FIG. 5E illustrates an example of operations of the processing unit.

FIG. 5E illustrates a posi-nega histogram as a result of subtraction between the histograms of the number of occurrences of the first and the second events. In the result of the subtraction, the sparse counts due to the positive-side noise in the histogram (posi) of the number of occurrences of the first event substantially offset the sparse counts due to the negative-side noise in the histogram (nega) of the number of occurrences of the second event. Thus, the tall bin (positive frequency) due to the detection of the reflected light in the third interval stands out, and thus can be clearly distinguished from lower bins (negative or zero frequency) in the other intervals.

Thus, the position on the time axis corresponding to the third interval corresponds to the time period from the emission to the detection, by the detection unit 200, of the measuring beam.

Figure 6:
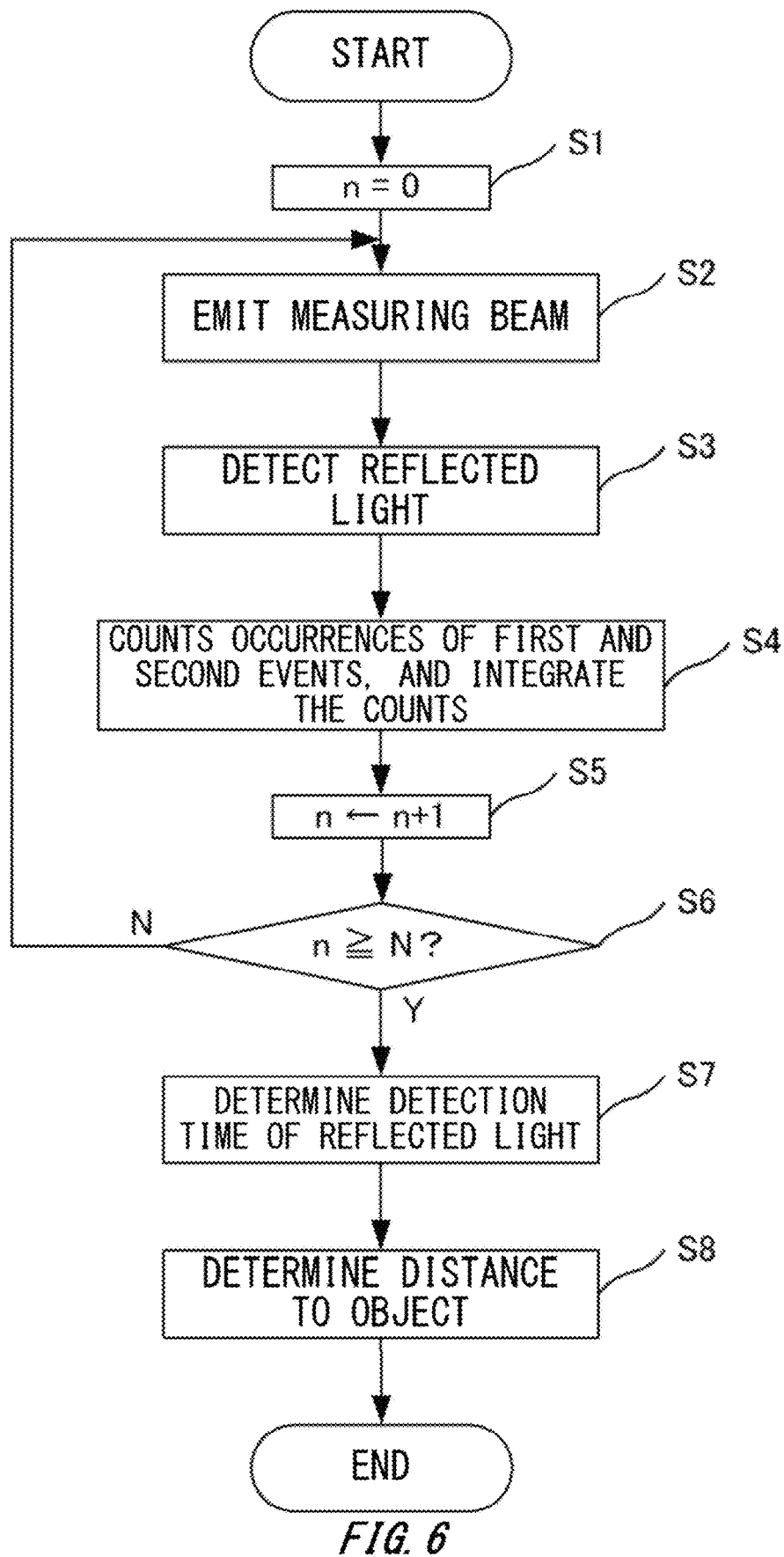
FIG. 6 illustrates an operation flow of a ranging method performed by a ranging device according to the present embodiment.

FIG. 6 illustrates an operation flow of a ranging method performed by the ranging device 10 according to the present embodiment, based on the trivalent histogram method. The ranging method includes a photodetection method. The control unit 132 starts the operation flow, when the operation button 133 is pressed by the user. In single ranging, the measuring beam is emitted for a plurality of (N>>1) times. The first and the second thresholds compared with the intensity of the detection signal are different from each other. In the present embodiment, the second threshold is smaller than the first threshold, and more preferably, the first threshold is set to be larger than the offset level of the detection signal, and the second threshold is set to be smaller than the offset level of the detection signal.
Conversely, the second threshold may be larger than the first threshold, more preferably, the first threshold may be set to be smaller than the offset level of the detection signal, and the second threshold may be set to be larger than the offset level of the detection signal.

In step S1, the control unit 132 resets a counter n (set to be zero).

In step S2, the projector 100 emits the measuring beam toward the object.

In step S3, the detection unit 200 detects the measuring beam reflected from the object, that is, the reflected light.

In step S4, the processing unit 300 counts the occurrences of the first event in which the intensity of the detection signal output from the detection unit 200 exceeds the first threshold and of the occurrence of the second event in which the intensity falls below the second threshold, for the measuring beam emission from the projector 100 in step S2, at a common interval, that is, for each elapsed time from the measuring beam emission, integrates the counts, and stores the results of the integration in the memory 323. Here, the processing unit 300 compares the intensity of the detection signal with the first threshold, and counts the occurrences of the first event when the intensity of the detection signal exceeds the first threshold. The processing unit 300 also compares the intensity of the detection signal with the second threshold, and counts of the occurrences of the second event when the intensity of the detection signal falls below the second threshold.

In step S5, the control unit 132 increments the counter n by one.

In step S6, the control unit 132 determines whether the counter n is equal to or larger than N. When the counter n is smaller than N, the processing returns to step S2, to repeat steps S2 to S6. Specifically, the projector 100 emits the measuring beam toward the object N times. The processing unit 300 counts the occurrences of the first event and of the occurrence of the second event for each measuring beam emission by the projector 100, for each elapsed time from the measuring beam emission, and integrates the counts for N times of the measuring beam emission. Thus, after the Nth emission, the histograms of the number of occurrences of the first and the second events are created.

Figure 7A:
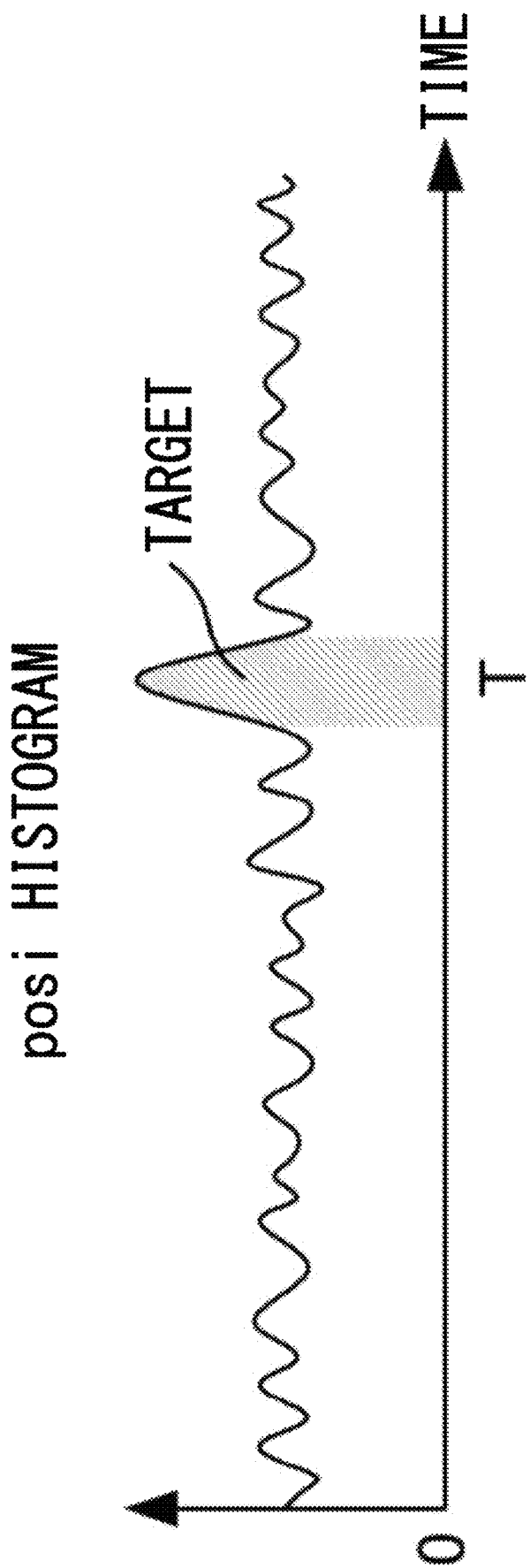
FIG. 7A illustrates an example of a histogram created by the processing unit.
Figure 7B:
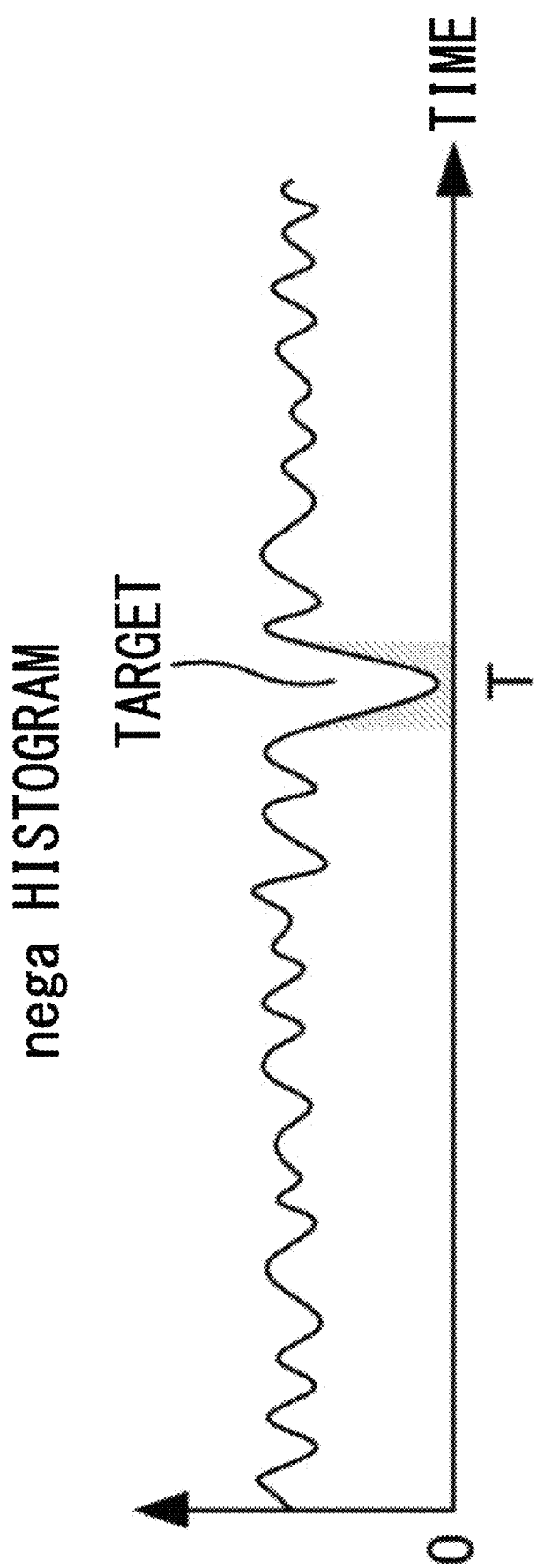
FIG. 7B illustrates an example of a histogram created by the processing unit.
Figure 7C:
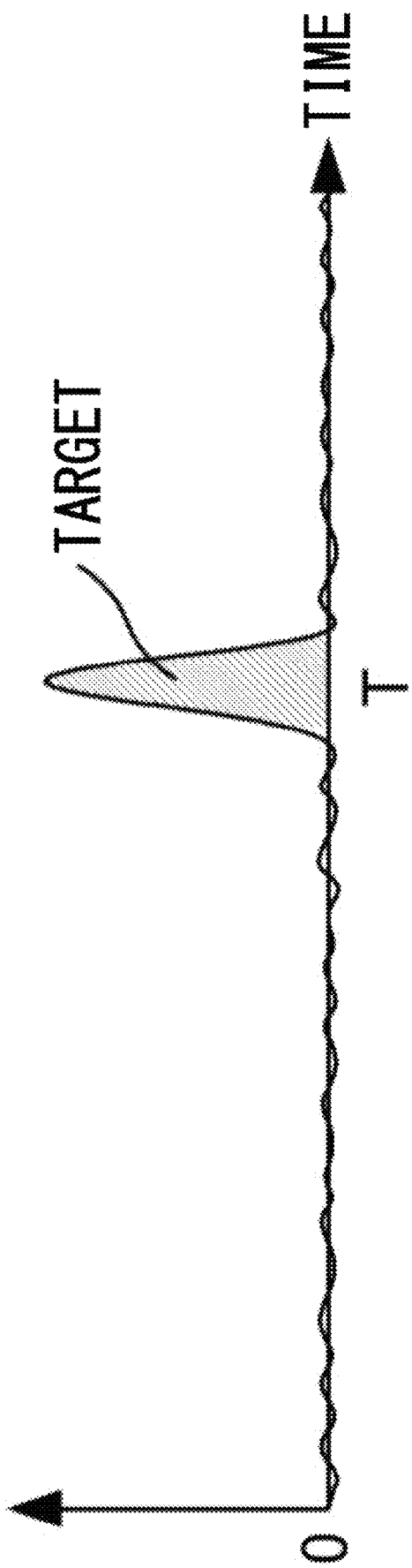
FIG. 7C illustrates an example of a histogram created by the processing unit.

FIGS. 7A to 7C illustrate examples of a histogram created by N times of measuring beam emission. In a histogram (posi) of the number of occurrences of the first event illustrated in FIG. 7A, a peak of the counts of the first event due to the detection of the reflected light at a time point T is distinguished from low level counts due to noise (positive-side noise) at other time points. In a histogram (nega) of the number of occurrences of the second event illustrated in FIG. 7B, a valley of the counts of the second event due to the detection of the reflected light at the time point T, can be found in high level counts due to noise (negative-side noise) at other time points.

When the counter n is equal to or larger than N, the processing proceeds to step S7.

In step S7, the processing unit 300 determines the detection time T of the reflected light, based on the integration results (that is, the histograms) of integrating the counts that are the number of occurrences of the first and the second events for N times of light emission.

Here, the processing unit 300 subtracts the histogram frequency of the counts that are the number of occurrences of the second event from the histogram frequency of the counts that are the number of occurrences of the first event.

FIG. 7C illustrates a result (posi-nega) of subtraction between the frequencies of the histograms of the number of occurrences of the first and the second events. The peak (target in FIG. 7A) of the counts derived from the detection of the reflected light included in the histogram (posi) of the number of occurrences of the first event is subtracted by the valley (target in FIG. 7B) of the counts derived from the detection of the reflected light included in the histogram (nega) of the number of occurrences of the second event. As a result, the high target count due to the detection of the reflected light stands out. The target count can be clearly distinguished from sparse and extremely low (or substantially constant) background level, with the counts derived from the noise (positive-side noise) included in the histogram of the number of occurrences of the first event substantially offsetting the counts derived from the noise (negative-side noise) included in the histogram of the number of occurrences of the second event. A peak of the target count derived from the detection of the reflected light that has failed to be clearly distinguished from the background level, becomes clearly distinguishable by increasing the number of emissions of the measuring beam.

The processing unit 300 determines the detection time T of the reflected light, as the position where the frequency is the highest or is equal to or higher than a threshold in the histogram (posi-nega) indicating the result of subtraction between the histograms of the number of occurrences of the first and the second events.

In step S8, the processing unit 300 determines the distance Tc/2 (c is the speed of light) to the object, based on the detection time T of the reflected light determined in step S7. When the processing unit 300 displays the determined distance on the reticle plate 140, the control unit 132 terminates the operation flow of the ranging method.

The first threshold and the second threshold may be determined using steps S1, S3, and S6 in the ranging operation flow described above. Specifically, without the projector 100 emitting the measuring beam, for the detection signal of the light from the object detected by the detection unit 200 in step S3, the occurrence of each of the first and the second events is counted in step S4. The counts of each of the events are integrated for a plurality of detection signals (step S3 and S4 are repeated N times), and the first threshold and the second threshold are adjusted to reduce the difference between the results of integrating the occurrence counts of the first and the second events. In such a case, the first threshold and the second threshold may be optimized with the second threshold adjusted with the first threshold fixed, the first threshold adjusted with the second threshold fixed, or with these adjustments repeated for a plurality of times.

With the ranging device 10 and the ranging method according to the present embodiment, occurrence of the first event in which the intensity of the detection signal corresponding to the reflected light output from the detection unit 200 exceeds the first threshold and occurrence of the second event in which the intensity falls below the second threshold smaller (or larger) than the first threshold are counted for each elapse of a time period after the measuring beam emission from the projector 100. Based on the integration results (i.e., histograms) obtained by integrating the counts for a plurality of times of light emission, the target signal derived from the reflected light can be extracted from the detection signal including random noise derived from the external light, the detection time of the reflected light can be precisely determined, and the distance to the object can be precisely determined. In particular, using the trivalent histogram method based on counting and integrating the occurrences of the first and the second event with the detection signal using two different thresholds, the reflected light is detected and at the same time, the background is determined using the negative-side noise, whereby the background can be determined in parallel with the ranging operation.

Figure 8:
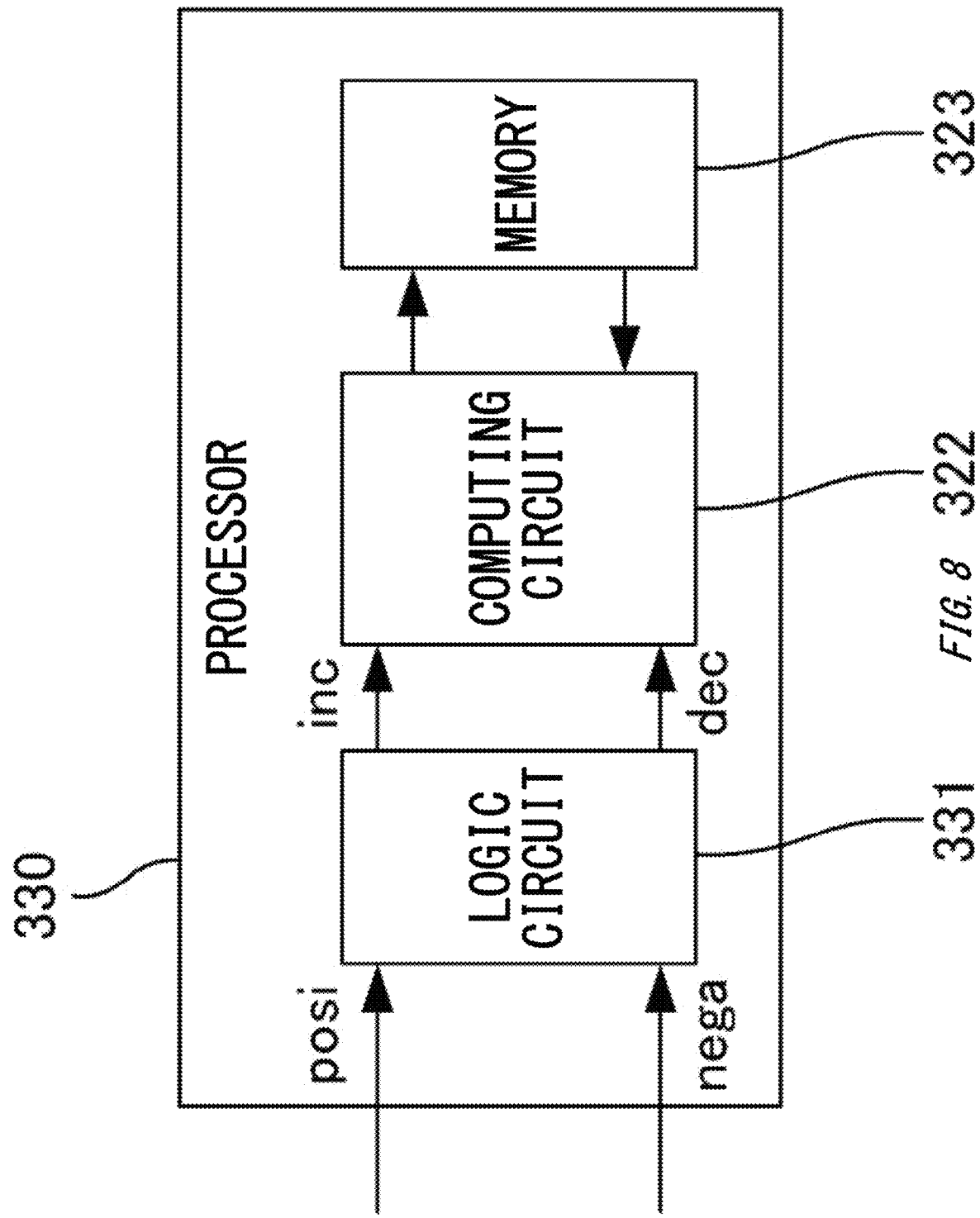
FIG. 8 illustrates a configuration of a processor included in a processing unit according to a modification.

FIG. 8 illustrates a configuration of a processor 330 included in a processing unit 300 according to a modification. The processor 330 includes a logic circuit 331, a computing circuit 322, and a memory 323. The memory 323 has a configuration similar to that described above.

The logic circuit 331 performs a logical operation upon receiving the output signals posi and nega from the comparators 311 and 312, and outputs operation results inc and dec thus obtained to the computing circuit 322.

FIG. 9 illustrates the logical operation procedure by the logic circuit 331. The logic circuit 331 outputs the operation result inc, dec=0, 0 in response to input signals posi, nega=0, 0, outputs the operation result inc, dec=1, 0 in response to input signals posi, nega=1, 0, outputs the operation result inc, dec=0, 1 in response to input signals posi, nega=0, 1, and outputs the operation result inc, dec=0, 0 in response to input signals posi, nega=1, 1.

For each of a plurality of times of the measuring beam emission from the projector 100, the computing circuit 322 positively counts when the first event occurs and negatively count when the second event occurs, for each predetermined elapsed time after the measuring beam emission, and integrates the resultant counts for the plurality of times of the measuring beam emission. Sampling of each of the output signals inc and dec from the logic circuit 331 at a common interval (for example, frequency of 240 MHz), triggered by each emission timing of the measuring beam transmitted from the control unit 132, is performed for the emission of the measuring beam emission. At each interval, when the operation results inc, dec=0, 0 are obtained from the logic circuit 331, zero counting is performed (nothing is performed) assuming that neither of the events is detected or both events occur so that the counts are offset, when the operation results inc, dec=1, 0 are obtained from the logic circuit 331, positively counting is performed assuming that only the first event has occurred, and when the operation results inc, dec=0, 1 are obtained from the logic circuit 331, negatively counting is performed assuming that only the second event has occurred. The computing circuit 322 integrates the counts of the first and the second events, that is, the positive counts and the negative counts, in the common storage area in the memory 323. Thus, capacity used in the storage area can be reduced.

With this configuration, in step S4 in the operation flow of the ranging method by the ranging device 10, for each of a plurality of times of the measuring beam emission from the projector 100, the computing circuit 322 positively counts in response to the occurrence of the first event only (outputs posi, nega=1, 0 from the comparators 311 and 312) and negatively counts in response to the occurrence of the second event only (outputs posi, nega=0, 1 from the comparators 311 and 312), for each predetermined elapsed time after the measuring beam emission, and then integrates the resultant counts in the common storage area in the memory 323, for the plurality of times of light emission.

In the present modification, the computing circuit 322 positively counts when the first event occurs, and negatively counts when the second event occurs. Alternatively, for each of a plurality of times of the measuring beam emission from the projector 100, the computing circuit 322 may negatively count when the first event occurs, and positively count when the second event occurs, for each predetermined elapsed time after the measuring beam emission, and then integrate the resultant counts for the plurality of times of the measuring beam emission.

The ranging device 10 according to the present embodiment emits the measuring beam to the object, detects the reflected light, and determines the detection time, that is, the propagation time of the measuring beam, to measure the distance to the object. Alternatively, a condition of a medium in which the measuring beam propagates, that is, the temperature, humidity, barometric pressure, refractive index, etc, around the measurement position may be measured based on the propagation time of the measuring beam.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As is apparent from the description above, according to a embodiment(s) of the present invention can provide "a photodetector and a method and a ranging device and a method".

What is claimed is:
1. A photodetector comprising:
  a projector configured to emit light to an object for a plurality of times;
  a detector configured to detect reflected light from the object; and
  a processor programmed to, for each light emission from the projector:
    count, for a sequence of predetermined elapsed times from the light emission, an occurrence of a first event in which intensity of a detection signal output from the detector exceeds a first threshold;

count, for the sequence of predetermined elapsed times from the light emission and simultaneously with the count of the occurrence of the first event, an occurrence of a second event in which the intensity falls below a second threshold different in value than the first threshold, the intensity of the detection signal being greater than zero at both the first threshold and the second threshold;

integrate the counts of the occurrence of the first event for the plurality of times of light emission for each elapsed time to determine a positive histogram;

integrate the counts of the occurrence of the second event for the plurality of times of light emission for each elapsed time to determine a negative histogram; and determine a detection time from the light emission to detection of the reflected light by the detector based on the positive histogram and the negative histogram.

2. The photodetector according to claim 1, wherein the processor is further programmed to subtract the negative histogram from the positive histogram and to determine the detection time based on a result of the subtraction.

3. The photodetector according to claim 1, wherein for each of the plurality of times of light emission from the projector, the processor is further programmed to positively count the occurrence of the first event and negatively count the occurrence of the second event for each of the predetermined elapsed times from the light emission, and to integrate resultant counts for the plurality of times of light emission.

4. The photodetector according to claim 1, wherein the processor is further programmed to compare the intensity of the detection signal output from the detector with the first threshold, to invert the intensity of the detection signal, and to compare the inverted intensity with the second threshold.

5. The photodetector according to claim 1, further comprising:
a converter configured to convert the detection signal output from the detector into differential signals including a set of a first signal and a second signal, and to input the differential signals into the processor, wherein
the processor is further programmed to compare the differential signals with each other in intensity, and
the processor is programmed to compare an intensity of the first signal with an intensity of the second signal, to invert the intensity of the first signal, and to compare the inverted intensity of the first signal with the intensity of the second signal.

6. The photodetector according to claim 5, wherein a difference as a result of subtracting the first signal from the second signal is equal to the detection signal.

7. The photodetector according to claim 5, wherein:
the processor is further programmed to convert the first signal and the second signal into a first offset level and a second offset level;
the processor is further programmed to convert the first signal and the second signal into a third offset level and a fourth offset level;
a difference as a result of subtracting the second offset level from the first offset level is equal to the first threshold; and
a difference as a result of subtracting the fourth offset level from the third offset level is equal to the second threshold.

8. The photodetector according to claim 1, wherein during times that the projector does not emit the light, the processor is further programmed to:
count the occurrence of each of the first event and the second event for the detection signal output from the detector;
integrate the counts for a plurality of the detection signals; and
adjust at least one of the first threshold and the second threshold to reduce a difference between results of integrating the counts of the occurrence of the first event and the second event.

9. The photodetector according to claim 1, wherein
one of the first threshold and the second threshold is larger than an offset level of the detection signal, and
the other of the first threshold and the second threshold is smaller than the offset level of the detection signal.

10. The photodetector according to claim 1, wherein the processor is further programmed to count the occurrence of each of the first event and the second event at each of the predetermined elapsed times.

11. A ranging device configured to determine a distance from the projector to the object based on the detection time determined by the photodetector according to claim 1.

12. A photodetector comprising:
a projector configured to emit light to an object for a plurality of times;
a detector configured to detect reflected light from the object;
a converter configured to convert a detection signal output from the detector into differential signals including a first signal and a second signal with a polarity of the first signal being inverted; and
a processor programmed to:
generate a third signal with the first signal provided with a first offset;
generate a fourth signal with the first signal provided with a second offset different in value than the first offset;
in each of the plurality of times of light emission from the projector, for each of a sequence of predetermined elapsed times from the light emission, (i) compare an intensity of the second signal and an intensity of the third signal to count an occurrence of a first event in which the intensity of the second signal exceeds the intensity of the third signal, and (ii) compare the intensity of the second signal and an intensity of the fourth signal to count, simultaneously with the count of the occurrence of the first event, an occurrence of a second event in which the intensity of the second signal falls below the intensity of the fourth signal, the intensities of both the third signal and the fourth signal being greater than zero;
integrate the counts for the plurality of times of light emission for each elapsed time; and
determine a detection time from the light emission to detection of the reflected light by the detector based on a result of the integration.

13. A photodetection method comprising:
emitting light to an object for a plurality of times;
detecting reflected light from the object;
for each light emission, (i) counting, for a sequence of predetermined elapsed times from the light emission, an occurrence of a first event in which an intensity of a detection signal of the reflected light exceeds a first threshold, and (ii) counting, for the sequence of predetermined elapsed times from the light emission and simultaneously with the count of the occurrence of the first event, an occurrence of a second event in which the intensity falls below a second threshold different in value than the first threshold, the intensity of the detection signal being greater than zero at both the first threshold and the second threshold;

integrating the counts of the occurrence of the first event for the plurality of times of light emission for each elapsed time to determine a positive histogram;

integrating the counts of the occurrence of the second event for the plurality of times of light emission for each elapsed time to determine a negative histogram; and determining a detection time from the light emission to detection of the reflected light based on the positive histogram and the negative histogram.

14. The photodetection method according to claim 13, wherein the determining comprises subtracting the negative histogram from the positive histogram and determining the detection time based on a result of the subtracting.

15. The photodetection method according to claim 14, wherein the integrating comprises, for each of the plurality of times of light emission, positively counting the occurrence of the first event and negatively counting the occurrence of the second event for each of the predetermined elapsed times from the light emission, and integrating resultant counts for the plurality of times of light emission.

16. The photodetection method according to claim 13, wherein the integrating comprises converting the detection signal of the reflected light into differential signals including a set of a first signal and a second signal.

17. The photodetection method according to claim 16, wherein a difference as a result of subtracting the first signal from the second signal is equal to the detection signal.

18. A ranging method comprising determining a distance from the projector to the object based on the detection time determined by the photodetection method according to claim 13.

* * * * *